United States Patent [19]

Thompson

[11] Patent Number: 4,879,035
[45] Date of Patent: Nov. 7, 1989

[54] ALL SEASON FUEL FILTER

[76] Inventor: Allen O. Thompson, P.O. Box 182, Granville, N. Dak. 58741

[21] Appl. No.: 312,382

[22] Filed: Feb. 17, 1989

Related U.S. Application Data

[63] Continuation of Ser. No. 99,774, Sep. 22, 1987.

[51] Int. Cl.[4] .............................................. D01D 35/02
[52] U.S. Cl. ..................................... 210/416.4; 55/267; 210/168; 210/186; 210/416.5; 210/DIG. 17
[58] Field of Search ...................... 210/168, 186, 416.4, 210/416.5, 489–491, DIG. 17, 248; 55/267

[56] References Cited

U.S. PATENT DOCUMENTS

| | | | |
|---|---|---|---|
| 2,985,552 | 5/1961 | Watanabe | 154/44 |
| 3,272,337 | 9/1966 | Elwell | 210/136 |
| 3,285,455 | 11/1966 | Pewitt | 215/100.5 |
| 3,294,240 | 12/1966 | Korte | 210/181 |
| 3,319,328 | 5/1967 | Finger et al. | 29/423 |
| 3,344,925 | 10/1967 | Graham | 210/312 |
| 3,374,298 | 3/1968 | Studen | 264/1 |
| 3,775,350 | 11/1973 | Juhas | 260/25 AZ |
| 3,846,526 | 11/1974 | Wade | 264/46.8 A |
| 3,858,632 | 1/1975 | Stout | 150/52 R |
| 3,906,129 | 9/1975 | Damois | 428/99 |
| 3,941,159 | 3/1977 | Toll | 138/147 |
| 4,103,701 | 8/1978 | Jeng | 137/375 |
| 4,114,759 | 9/1978 | Maloney, Jr. | 206/523 |
| 4,142,565 | 3/1979 | Plunkett, Sr. | 150/52 R |
| 4,230,142 | 10/1980 | Saarem et al. | 137/202 |
| 4,329,231 | 5/1982 | Hoffman et al. | 210/416.4 |
| 4,449,554 | 5/1984 | Busse | 138/147 |
| 4,452,697 | 6/1984 | Conrad | 210/DIG. 17 X |
| 4,454,037 | 6/1984 | Conterio et al. | 210/416.5 X |
| 4,522,712 | 6/1985 | Fischer et al. | 210/DIG. 17 X |
| 4,540,611 | 9/1985 | Henderson | 428/12 |

Primary Examiner—Charles Hart
Attorney, Agent, or Firm—Merchant, Gould, Smith, Edell, Welter & Schmidt

[57] ABSTRACT

A fuel filter having an insulating layer 22 integrally constructed therewith provides thermal insulation for fuel filters such as those used in internal combustion engines. The insulating layer 22 covers substantially all the sides and bottom of a fuel filter 24, but remains open at the top of the fuel filter 24, such that connection of the device to an engine fuel circuit is easily allowed.

3 Claims, 2 Drawing Sheets

FIG. 1
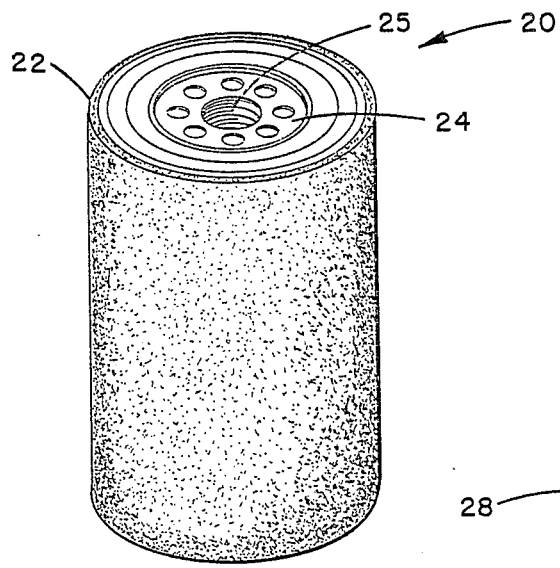
FIG. 2
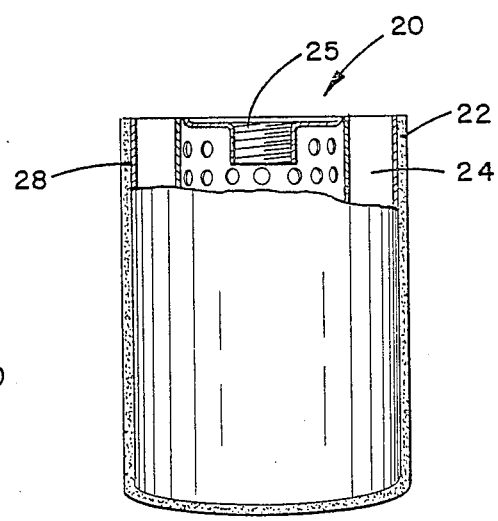
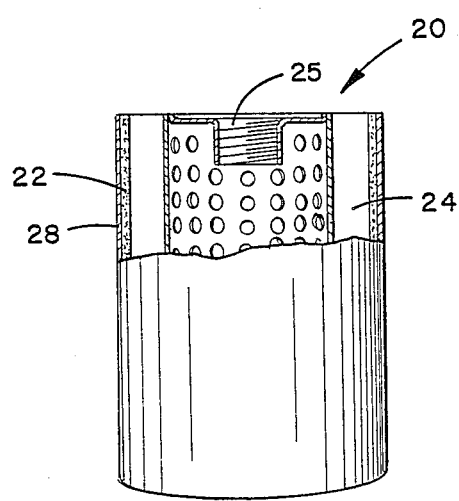
FIG. 5

ALL SEASON FUEL FILTER

This is a continuation of Ser. No. 099,774, filed Sept. 22, 1987.

TECHNICAL FIELD OF THE INVENTION

The present invention relates to insulated fuel filters on an internal combustion engine, for use primarily in cold weather.

BACKGROUND OF THE INVENTION

Internal combustion engines equipped with fuel filters have found wide use in many applications throughout the world. In cold climates, however, operation of such engines is sometimes difficult. One area of particular difficulty has been the freezing of fuel in the fuel filter, resulting in the cutoff of fuel supply to the engine.

One prior art attempt to address this difficulty is enumerated in U.S. Pat. No. 4,329,231, granted to Hoffman et al. on May 11, 1982. Hoffman et al. provides a thermally insulating fuel filter cover which slips over the fuel filter of an engine. While this invention partially addresses the problem of freezing fuel filters, major drawbacks inherent in the device limit its widespread application.

First, since the fuel filter cover slips on, it is also liable to slipping off. This slippage may occur such that the vehicle operator is unaware of its occurrence and thus believes his fuel filter is protected from cold when it is not. This situation could result in freezing of the unprotected fuel filter. In addition, the presence of a loose fuel filter cover in the engine of a vehicle is a hazard to the operation of that vehicle, since interference with other parts and/or fire could be the result. Second, because space is provided between the fuel filter and the cover in the invention of Hoffman et al. fuel may become disposed in this space, thus detracting from the insulating qualities of the cover and possibly freezing between the cover and the fuel filter.

The present invention solves this problem and many others associated with the prior art.

SUMMARY OF THE INVENTION

The present invention is a fuel filter having an insulating layer integrally constructed therewith, the insulating layer covering substantially all the sides and bottom of the fuel filter, but remaining largely open at the top of the fuel filter, such that connection of the fuel filter to an engine fuel circuit is easily allowed. The insulating layer comprises a body of insulating material, such as urethane, and may be of either a substantially cylindrical or substantially rectangular shape, conforming to the shape of a fuel filter with which it is used.

An advantage of one embodiment of the present invention is the provision of a substantially transparent insulating layer disposed on the exterior surface of a fuel filter, which allows indicia such as names and serial numbers commonly displayed on a fuel filter's exterior surface to be read through the substantially transparent insulating layer.

Another advantage of an embodiment of the present invention is the integral construction of the insulating layer with the fuel filter, such that there remains no space in which fuel or other moisture may become disposed, thus detracting from the insulating quality of the insulating layer.

Yet another advantage of an embodiment of the present invention is the integral construction of an insulating layer, providing an insulation factor which keeps fuel disposed in the fuel filter cool on hot days, as well as warm on cold days.

An advantage of another embodiment of the present invention is the disposal of the insulating layer on the inside of an outer wall of the fuel filter, such that it is protected by said outer wall.

An advantage of yet another embodiment of the present invention is the provision of an insulating layer on the exterior surface of an outer wall of the fuel filter which may be of opaque material, such that various colors of insulation may represent various degrees of insulation protection for the fuel filter.

The above described features and advantages, along with various other advantages and features of novelty, are pointed out with particularity in the claims annexted hereto and forming a part hereof. However, for a better understanding of the invention, its advantages, and objects attained by its use, reference should be had to the drawings which form a further part hereof and to the accompanying descriptive matter in which there is illustrated and described a preferred embodiment of the invention.

BRIEF DESCRIPTION OF THE DRAWINGS

In the drawings, in which like reference numerals generally indicate corresponding parts throughout the several views;

FIG. 1 is a perspective view of an embodiment of an insulated fuel filter in accordance with the principles of the present invention, illustrating the disposal of an insulating layer about a cylindrically-shaped fuel filter;

FIG. 2 is a cross-sectional view of the insulated fuel filter embodiment shown in FIG. 1;

FIG. 5 is a cross-sectional view similar to FIG. 2, except that the insulating layer is disposed within the outer wall of the fuel filter itself.

DETAILED DESCRIPTION OF A PREFERRED EMBODIMENT OF THE PRESENT INVENTION

Figure 3:
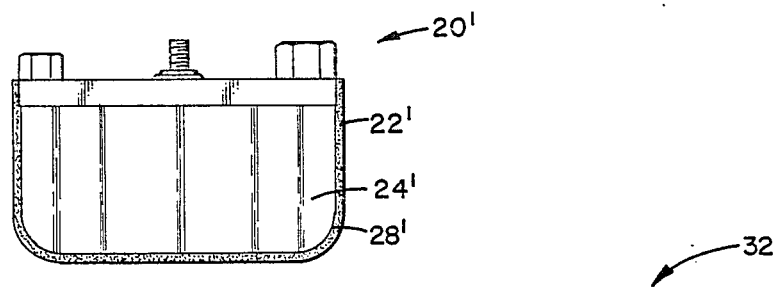
FIG. 3 is a cross-sectional view of another embodiment of an insulated fuel filter in accordance with the principles of the present invention, illustrating the disposal of an insulating layer about a rectangularly-shaped fuel filter.
Figure 4:
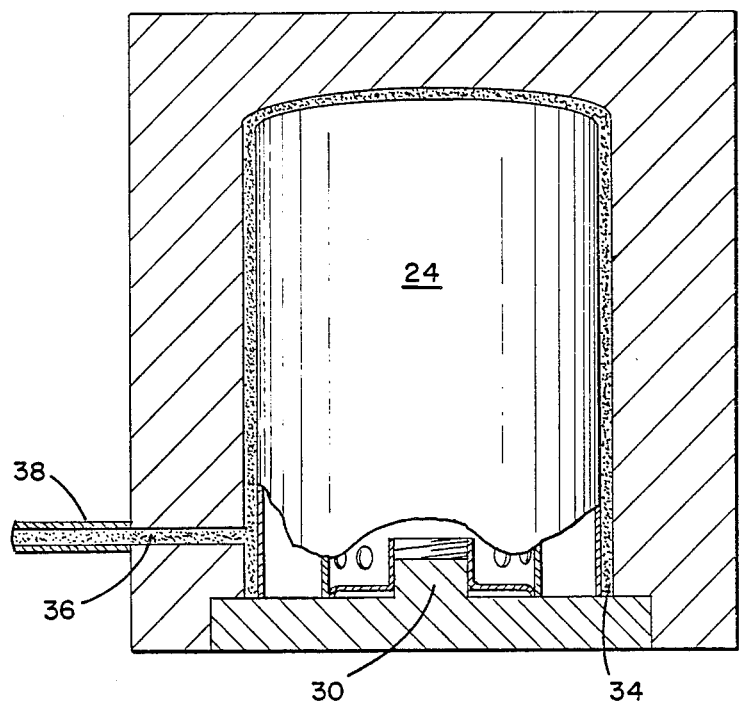
FIG. 4 is a cross-sectional view of an apparatus for manufacturing insulated fuel filters in accordance with the principles of the present invention.

Referring now to the drawing, there is illustrated in FIGS. 1 and 2 an embodiment of an insulated fuel filter 20 in accordance with the principles of the present invention. The insulated fuel filter 20 has an insulating layer 22 integrally constructed therewith, said layer 22 covering substantially all the sides and bottom of the fuel filter portion 24 of the invention, but remaining open at the top of fuel filter 24, such that connection of the insulated fuel filter 20 to an engine fuel circuit is easily allowed. Such connection is achieved through use of a threaded bore 25 disposed substantially in the center of fuel filter 24.

Layer 22 of the preferred embodiment is constructed of a transparent urethane material and has a thickness of about 0.200 inches. Layer 22 conforms to the exterior dimensions of fuel filter 24, whether fuel filter 24 is of substantially cylindrical or of substantially rectangular shape. An insulated fuel filter 20' of substantially rectangular shape is illustrated in FIG. 3. Elements of the insulated fuel filter 20' illustrated in FIG. 3 which correspond to elements of the hereinbefore described embodiment are indicated with the same reference numerals, except that the reference numerals of the insulated fuel filter 20' are primed. If fuel filter 24 is of substantially cylindrical shape, the bottom portion 26 of the insulating layer 22 may be dome-shaped, to better conform to the bottom surface of the fuel filter 24.

The substantially transparent construction of the insulating layer 22 facilitates the use of conventional fuel filters in the invention, since indicia such as serial numbers and names, for instance, stamped on the exterior of fuel filter 24 may still be read through insulating layer 22 after application of said layer.

Insulating layer 22 is preferably applied to the fuel filter 24 after fuel filter 24 has been manufactured, but an insulating layer could also be included in the construction of fuel filters, such that said layer would be disposed radially inward from an outer wall 28 of the fuel filter 24, as shown in FIG. 5. In addition to the transparent urethane previously discussed, an opaque material could also be used to form insulating layer 22, whether disposed on the interior or exterior of the outer wall 28 of the fuel filter 24. However, placing of the insulating layer 22 on the interior of the outer wall 28 of the fuel filter 24 would prevent the user from seeing cracks which might occur in the insulating layer. Furthermore, use of an opaque material on the exterior surface of the fuel filter's outer wall 28 might necessitate the stamping of identifying indicia on the exterior of the insulating layer 22, since users would be prevented from seeing the outer wall 28 of the fuel filter 24, on which such indicia are usually displayed. An identification function could, however, be performed by the insulation layer 22 itself, since said layer might be constructed of different colors of opaque insulation, with various colors indicating differing degrees of insulation protection. Each of the previously described applications is within the scope of the present invention.

Manufacture of the preferred embodiment, as previously stated, is carried out after assembly of conventional fuel filters has occurred and involves several steps of construction. First, the fuel filter 24 is releasably attached to a support 30, such that the exterior surface of said fuel filter, with the exception of the top, is entirely exposed. Second, a mold-like apparatus 32 having the same shape as the fuel filter, but of larger dimensions, is placed over the fuel filter 24, such that a gap of about 0.200 inches in diameter is created between the mold-like apparatus 32 and the fuel filter 24. Third, the bottom portion 34 of the 0.200 inch gap, that disposed about the top of the fuel filter 24 is sealed. However, there is provided in the mold-like apparatus 32 at least one aperture 36 into which a hose 38 can be disposed. Fourth, heated liquid urethane material is pumped into the gap via the hose 38 until all spaces between the mold-like apparatus 32 and the fuel filter 24 are filled. Fifth, the liquid urethane material is allowed to cool and harden, then the mold-like apparatus 32 is removed from over the fuel filter 24, such that an insulating layer 22 of substantially solid urethane material remains disposed on the exterior surface of the fuel filter 24.

In use, the insulated fuel filter 20 is installed in the fuel circuit of an engine just as a conventional fuel filter is installed. Provision of an insulating layer provides protection against cold for the filter and integral construction prevents any moisture from reaching the fuel filter 24 itself, thus providing a dual provision against freezing and/or other malfunction. It will be appreciated that while protection against the freezing of fuel in the fuel filter is the primary function of the present invention, the insulating layer could also act as protection against overheating of fuel in the fuel filter in very hot weather.

It is to be understood that even though numerous characteristics and advantages of the present invention have been set forth in the foregoing description, together with details of the structure and function of the invention, the disclosure is illustrative only and changes may be made in details, especially in matters of shape, size and arrangement of parts within the principles of the invention, to the full extent indicated by the broad general meaning of the terms in which the appended claims are expressed.

I claim:

1. A fuel filter, comprising:
   (a) a fuel filter housing having sides, a bottom and a top; and
   (b) a separate, distinct insulating layer of urethane material being permanently attached to the outside of the fuel filter housing along the sides and bottom of the fuel filter housing so as to insulate the fuel filter from its ambient surroundings.

2. A fuel filter in accordance with claim 1, wherein the insulating layer is a clear urethane material.

3. A fuel filter in accordance with claim 1, wherein the insulating layer has a wall thickness of about 0.200 inches.

* * * * *